M. H. BENEDICT.
DUST PAN.
APPLICATION FILED APR. 7, 1919.

1,311,802.

Patented July 29, 1919.

Inventor
M. H. Benedict

Attorney

UNITED STATES PATENT OFFICE.

MARTIN H. BENEDICT, OF MOHAWK, NEW YORK.

DUST-PAN.

1,311,802. Specification of Letters Patent. Patented July 29, 1919.

Application filed April 7, 1919. Serial No. 288,160.

*To all whom it may concern:*

Be it known that I, MARTIN H. BENEDICT, a citizen of the United States, residing at Mohawk, in the county of Herkimer and State of New York, have invented certain new and useful Improvements in Dust-Pans; and I do hereby declare the following to be a full, clear and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dust pans, and consists essentially in the provision of a triangular-shaped pan having a forked handle, adapted to be held in one position by the marginal edge of the opening in the dust pan and at an inclination by a coil formed in the arms of the handle which bears against the sides of the pan.

The invention comprises a simple and efficient device of this nature having various details of construction, combination and arrangement of parts which will be hereinafter fully described, shown in the accompanying drawings and then specifically defined in the appended claim.

Figure 1:
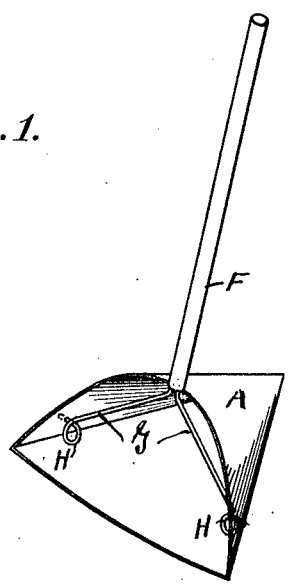
Figure 2:
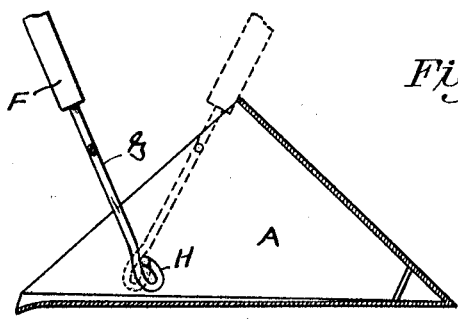
Figure 3:
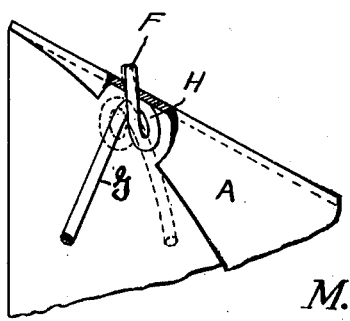
Figure 3:
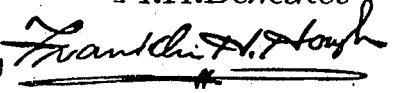

My invention is illustrated in the accompanying drawings which, with the letters of reference marked thereon, form a part of this application, and in which:

Figure 1 is a perspective view of the dust pan made in accordance with my invention, with the handle thrown its limit in one direction, Fig. 2 is a view showing the handle thrown in its opposite direction, parts being shown in elevation and Fig. 3 is a detail plan view partly in section.

Reference now being had to the details of the drawings by letter:

A designates a dust pan which may be of any suitable shape or size, preferably of general triangular outline, and having its lower edge bent downwardly, as shown. The bottom of the pan is preferably concaved slightly, and when pressure is applied to the inclined edge, through the medium of the handle, said inclined edge is adapted to be held tightly against the floor to receive dust and so forth.

The sides of the pan are provided with apertures E. The handle F is provided with branching arms G at one end, each of which is bent to form a coil H, said coils being formed so that when the handle is turned in one direction portions of the coil will bear against the sides of the pan and serve to hold the handle at the inclination shown in Fig. 2 of the drawings, and in which position it will be convenient to be gripped by a person when it is desired to use the pan and without making it necessary for the person to reach down to the floor to grip the handle.

By the provision of a dust pan made in accordance with my invention, it will be noted that means is provided for conveniently using the same, and by pressing down upon the handle the opposite edges of the pan may be sprung down so that the entire edge will be held flat against the floor, the handle being always in upright positions at its limit in one direction or the other when not in use.

What I claim to be new is:

A dust pan of general triangular outline with side walls and a housing over a portion thereof, a handle having arms each of which is bent to form a coil with ends journaled in apertures in the sides of the pan, portions of the coil designed when the handle is tilted to frictionally engage the inner surface of the sides of the pan to hold the handle at an inclination.

In testimony whereof I hereunto affix my signature in presence of two witnesses.

MARTIN H. BENEDICT.

Witnesses:
  A. M. HITZELBERGER,
  MRS. A. M. HENDRIX.